United States Patent [19]

Montes

[11] Patent Number: 5,004,335

[45] Date of Patent: Apr. 2, 1991

[54] SYSTEM FOR REPRODUCING THREE-DIMENSIONAL, THAT IS FOUR-DIMENSIONAL, IMAGES AND, PARTICULARLY MOVING IMAGES BY PROJECTION, WITHOUT THE USE OF COHERENT LIGHT

[76] Inventor: Juan D. Montes, Urbanizacion Las Cabanas II, Chalet No. 9 Las Rozas, Madrid, Spain

[21] Appl. No.: 247,368

[22] Filed: Sep. 21, 1988

Related U.S. Application Data

[63] Continuation-in-part of Ser. No. 138,665, Dec. 28, 1987, abandoned.

[30] Foreign Application Priority Data

Dec. 29, 1986 [ES] Spain ................................ 8603612

[51] Int. Cl.⁵ .............................................. G03B 35/00
[52] U.S. Cl. ........................................ 352/58; 352/43; 352/69; 352/81; 355/22; 350/128
[58] Field of Search ................ 352/58, 81, 69, 43; 355/22; 350/128

[56] References Cited

U.S. PATENT DOCUMENTS 1,883,290 10/1932 Ives ...................................... 350/128
1,918,705 7/1933 Ives ...................................... 352/58
3,482,913 12/1969 Glenn ................................... 352/58
4,078,854 3/1978 Yano ................................... 350/128

Primary Examiner—Monroe H. Hayes
Attorney, Agent, or Firm—Ladas & Parry

[57] ABSTRACT

System capable of reproducing high quality moving three-dimensional images with a non limited orthoscopic viewing angle consisting of the projection of several images $PR_1$. $PR_2$ ... $PR_n$, taken from several different spatial positions onto a transparent optical system; this transparent optical system is composed, in its front part, of an optical sheet of vertical cylinders (1) of small enough transverse dimensions so as to be imperceptible, such that the relationship between its transverse dimensions d and its focal length f is at least greater than the value obtained when dividing the distance between two adjacent projectors $K_R$ by the projection distance B and less than twice this value and in which its rear part has an optical sheet of horizontal cylinders 2, of transverse dimensions small enough so as to be imperceptible and of a semicircular cross-section or of an arc of a circle of sufficiently small radius, so as to allow all the observers to see the image in its full height; the thickness e of the optical system has to be such that the focal lines of these horizontal cylinders are on the same plane as that which contains the focal lines of the vertical cylinders.

19 Claims, 2 Drawing Sheets

SYSTEM FOR REPRODUCING THREE-DIMENSIONAL, THAT IS FOUR-DIMENSIONAL, IMAGES AND, PARTICULARLY MOVING IMAGES BY PROJECTION, WITHOUT THE USE OF COHERENT LIGHT

This is a continuation-in-part of application Ser. No. 138,665 filed Dec. 28, 1987 that was co-pending and is now abandoned.

BACKGROUND OF THE INVENTION

The invention relates to the reproduction of three-dimensional images and, particularly, moving images.

Known systems for recording and reproducing images with depth can be divided into two major groups: holographic systems and non-holographic systems.

Amongst the latter are stereoscopic and so-called three-dimensional systems, which differ from one another. The term stereoscopic (also sometimes called stereographic) is used for systems in which only two images, taken at a distance apart approximately equal to the average distance between human eyes, are used in the reproduction. The term three-dimensional (also sometimes called panoramagraphic) is used for systems in which a greater number of images are used in the reproduction. (The field of this invention is that of three-dimensional reproduction, as has just been defined, in motion.)

More specifically, holographic systems are based on the reconstruction of wavefronts. They require, therefore, coherent light sources, at least for image taking. Temporal coherence requires the light to be monochromatic. Spatial coherence requires the light to come from a point source. Therefore the development of these systems has been intimately linked with the development of the laser, since its light is intense and highly coherent.

Laser techniques for holography are complex and expensive. Great technical difficulties have to be overcome. This has hindered the commercialization of holograph systems. Holographically photographing distant objects, like the moon, is difficult, because such objects are difficult to light up with a coherent beam. It turns out, too, to be impossible to photograph sunsets or reflections of the sun or moon on the sea, landscapes, etc. Finally, because observation through a transparency is necessary, the size of the images that can be reproduced is limited.

Stereoscopic systems are based on bringing a different image to each eye of an observer. For this, two photographs are taken with two cameras, the objectives of which are separated from one another by a distance approximately equal to the average distance between human eyes.

There are various systems for reproducing the photographed images, depending on the procedure used to bring the image taken by the lefthand camera to an observer's left eye and that taken by the righthand camera to the right eye. They all require the observer to be provided with an optical, electronic or electromechanical appliance in front of his eyes, however, such as coloured, polarized or shuttering filters.

The systems with coloured filters (anaglyphs) bring a different image to each eye by placing a filter in front of each of the observer's eyes, red (or yellow) for one eye, green (or blue) for the other, each corresponding image being reproduced in red (or yellow) or in green (or blue).

In the systems with polarized light, polarized filters are respectively placed before the observer's eyes. The planes of polarization of the filters are perpendicular to one another. The planes of polarization of the light which reproduces the images are the same as those of the observer's filters.

In the shuttering systems, shutters are placed before the observer to interrupt the vision of each of the observers eyes. These leave each eye a viewing time that is complementary to that of the other. The images are also so reproduced alternately.

The principal limitation of stereoscopic systems in projection is that they require the observer to be inconvenienced by placing before him the coloured filters, polarized filters or shutters described above.

Other stereoscopic systems also exist in which bringing a different image to each eye is achieved, however, by procedures which are not suitable for projection. Amongst these are those which place an optical system between the observers and the reproduced image, such as the Brewster prism method, the Wheatstone flat mirror method or Kemp's concave mirror method, U.S. Pat. No. 4,623,223.

Some known three-dimensional systems of reproduction using ordinary light are capable of reproducing three-dimensional images in motion. All of the three-dimensional moving-image reproduction systems developed up till now, however, use a diffusion surface on which the various images are generated, projected, transmitted, amplified or, simply, printed. Typical in such image generation would be a cathode ray tube screen projection onto an opaque or translucent diffusion surface.

It is important to emphasize one characteristic that is common to any diffusion surface, because it greatly affects the design of all the three-dimensional reproduction systems that use this type of surface: every point on the diffusion surface is a point source of light radiating photons in all transmitting directions. As a result, any observer, whatever his position, will see the whole image reproduced from every point on the diffusion surface.

If two or more images for a three-dimensional reproduction system were reproduced at the same time at the same point of the diffusion surface, therefore, the photons coming from the different images would appear mixed together to any observer in any direction, that is, at least, there would be no three dimensionality. For this reason, the different images reproduced on the diffusion surface of every three-dimensional reproduction system are distinguished by reserving a different place on the diffusion surface (screen) for each, that is, by scalar image differentiation. The different places on the screen usually are very fine vertical stripes.

U.S. Pat. No. 4,737,840, the three-dimensional reproduction procedure used is projection through a vertically striped shield plate onto the diffusion surface.

In Haisma's U.S. Pat. No. 4,571,616, the three-dimensionally reproduced images are also vertically striped. In this case, however, the images are positioned on the diffusion screen by being guided along light conductors.

In all these cases, viewing is through an optical sheet of cylindrical lenses, that is, lenticular sheet. The focal lines of the cylindrical lenses are on a plane at which the diffusion surface is situated. The focal length of the cylindrical lenses can be short, such as about a millimeter, for example, so that the cylindrical lenses and diffusion sheet can be, at least practically, one.

It is important to bear in mind, too, that, in all such vertically striped three-dimensional reproduction systems, the transverse dimension of each vertical image stripe must be "n" times smaller than the transverse dimension of each cylindrical lens, wherein "n" is the number of vertical-stripe images to be reproduced. For this reason, the size of the cylindrical lenses is limited by that of the images, which are, in turn, "n" times smaller than the lenses.

The quality of the three-dimensional image reproduced is, however, lowered as the transverse dimension of the cylindrical lenses increases. The latter is, however, limited by the minimum practical transverse dimension of the vertical stripes for the image for each cylindrical lens.

The maximum viewing angle is also limited by the aperture of each cylindrical lens, which depends upon the relationship between the transverse dimension of the cylindrical lens and its focal length. If the viewing angle is exceeded by an observer, his observation includes an image stripe for an adjacent cylindrical lens, which produces an undesirable, so-called pseudoscopic effect, that is, inverted depth.

To ensure a good-quality reproduced image from such three-dimensional systems, it is also necessary:

1. That there be no space between each two adjacent cylindrical lenses; the cylindrical lenses must contact one another;

2. That the transverse dimension of the cylindrical lenses be small enough to be imperceptible; and 3. That the variation of the horizontal parallax appear to be continuous over a viewing angle wide enough so that pseudoscopy does not occur for any observer.

The 1st condition requires consideration of the maximum viewing angle without pseudoscopy. It is expressed by:

$$2 \tan^{-1}\left(\frac{\text{transverse dimension of cylindrical lenses}}{2 \times \text{focal length of cylindrical lenses}}\right),$$

which for ordinary materials, which have refractive indices of around 1.5, takes a value of approximately 54° or ±27° C. to a perpendicular from the diffusion surface. The preservation of this angle across a diffusion screen of reasonable size requires many precise correspondences between each of the many contactingly adjacent cylindrical lenses that are required and its image (group of "n" stripes), which is difficult to achieve and, therefore, expensive to manufacture.

The 2nd condition, which requires the transverse dimension of the cylindrical lenses to be small enough to be imperceptible requires transverse dimensions "d" for a healthy eye of:

$$d < \frac{\text{viewing distance in meters}}{3,500}.$$

This indicates, for example, $d = 0.3$ mm. for a viewing distance of 1 m. and $d = 0.08$ mm. for a viewing distance of 0.25 m. If 10 image stripes are used for each cylindrical lens, the transverse dimension of each image stripe then has to be 0.03 and 0.008 mm., respectively. These values are on the order of only 15 times the wavelength of visible light. The difficulties of making an image-stripe system for this, particularly keeping in mind the 1st condition, too, are obvious and, therefore, the price of a commercial product would be high.

The 3rd condition suggests a viewing angle greater than the 54° that can be achieved with ordinary materials, as discussed above with respect to the 1st condition. It also suggests the use of such fine image stripes that the manufacture of devices for producing them would not be viable.

These three conditions explain why such three-dimensional dimensional reproduction systems have not been brought onto the market successfully, not even for cinemato-graphy with small projection screens.

There are also so-called integral three-dimensional reproduction systems, which are capable of reproducing both horizontal and vertical parallax simultaneously. We owe their invention to Lippmann, the famous French optics scientist, in 1908. Their basis is a fly's eye lens sheet of glass or plastic, generally with a tremendous number of spherical plano-convex lenses (for example 10,000).

Examples of such integral three-dimensional projection reproduction systems are disclosed in Ando's U.S. Pat. No. 3,852,524. The Ando patent does not mention, however, the number of images required nor the band width required for their transmission. It says simply that they are multiple and transmitted by a carrier of very high frequency. In fact, however, the processes of image recording and reproduction require the handling of an enormous amount of information, because every plano-convex lens requires a full two-dimensional image and thousands of plano-convex lenses must be used. In addition to these problems, and that of using spherical optics (the fly's eye lens sheet), image reproduction is always carried out in all the systems described in the patent through a diffusion screen, which presents all the drawbacks of this already described.

The Haisma U.S. Pat. No. 4,571,616 already described also discloses an integral three-dimensional system based on images from conventional cameras in square mosaics of 3×3, for example. Reproduction is done by positioning the nine square mosaic images behind each spherical lens of a fly's eye lens sheet. The patent says that this is achieved by appropriately positioning optical conductors with mechanical means, but the complexity of manufacture previously considered for positioning "n" vertical image stripes behind each of several cylindrical lens then becomes much more serious, because it then involves positioning "$n^2$" squares of images behind each spherical lens. In addition, the system described by the Haisma patent still requires a diffusion screen, in this case composed of the ends of optical conductors.

Some other fields of application exist, in robotics, for example, for optical systems of spherical lenses (fly's eye lens sheets) as described, for example, in Stauffer's U.S. Pat. No. 4,410,804. These propose, however, only obtaining data on the range of objects and their shapes, and not three-dimensional image reproduction systems providing both vertical and horizontal parallaxes.

SUMMARY OF THE INVENTION

To avoid the drawbacks of the prior image-depth image-reproduction systems mentioned above, a three-dimensional image reproduction system has been developed which, as a distinctive feature, does not use a diffusion surface on which the different images for three dimensionality are focused. Instead, a transparent or specular optical sheet is used to transform any point of the optical sheet into a centre which emits each photon in a distinct direction determined by the incidence of the photon on the sheet. Consequently, if two or more images are projected onto the optical sheet at the same time from different spatial positions, the photons coming from the different projections retain their directional distinction after crossing or reflecting from it. The different images can be distinguished, because the photons of each one emerge from the optical sheet at different angles, that is with angular image differentiation for three dimensionality.

In one preferred embodiment, the optical sheet is composed of vertical cylindrical lenses placed before the focus of horizontally spaced projected images at a distance equal to the focal length of the cylindrical lenses. The focal length of the cylindrical lenses is such that the relationship between the transverse dimensions of each cylindrical lens and its focal length, i.e. aperture is at least equal to the relationship between the horizontal distance between horizontally adjacent image projectors and the projection distance from the projectors to the optical sheet and never greater than twice this amount. As a result, any observer within a horizontal viewing angle would see as many images as there are projectors, but the images would line up rectilinearly. Accordingly, a second optical sheet of horizontal cylindrical lenses having focal lines which are on the same focal plane as the vertical cylindrical lenses is used for converting the above rectilinear images into a rectangle. The focal length of these horizontal cylindrical lenses has to be as small as possible compared to their transverse dimension so that their aperture provides a view of a rectangle as tall as the optical system itself.

The advantages of this system as opposed to all the other systems in general are:

(A) The viewing angle can be made as big as may be desired, it depending only on the number of projectors, the distance between them and the projection distance;

(B) The size or transverse dimension of the cylindrical lenses is not limited by the number of images;

(C) No pseudoscopy is produced when the observer leaves the field of three dimensional vision;

(D) It is not necessary to create any complex device for dividing the projected images into ordered and interlocking vertical stripes, so that system becomes cheaper and is very simple to implement; and (E) Front projection is possible.

The same bases which have served to create the above three-dimensional reproduction system providing variation of horizontal parallax can also apply to the design of an integral reproduction system which reproduces variation of vertical and horizontal parallaxes. The design of the vertical cylindrical lenses that made for the reproduction of the horizontal parallax was the condition that the relationship between the transverse dimension of the vertical cylindrical lenses and their focal length was at least equal to the relationship between the horizontal distance between projectors and the projection distance and not greater than twice this amount. In order to reproduce vertical parallax, the projectors are arranged in a rectangle and the design of the horizontal cylindrical lenses will meet the same condition. That is, the relationship between the transverse dimension of the horizontal cylindrical lenses and their focal length must be at least equal to the relationship between the vertical distance between vertically spaced projectors and the projection distance vertical and less than twice this amount.

DESCRIPTION OF PREFERRED EMBODIMENTS

Figure 1:
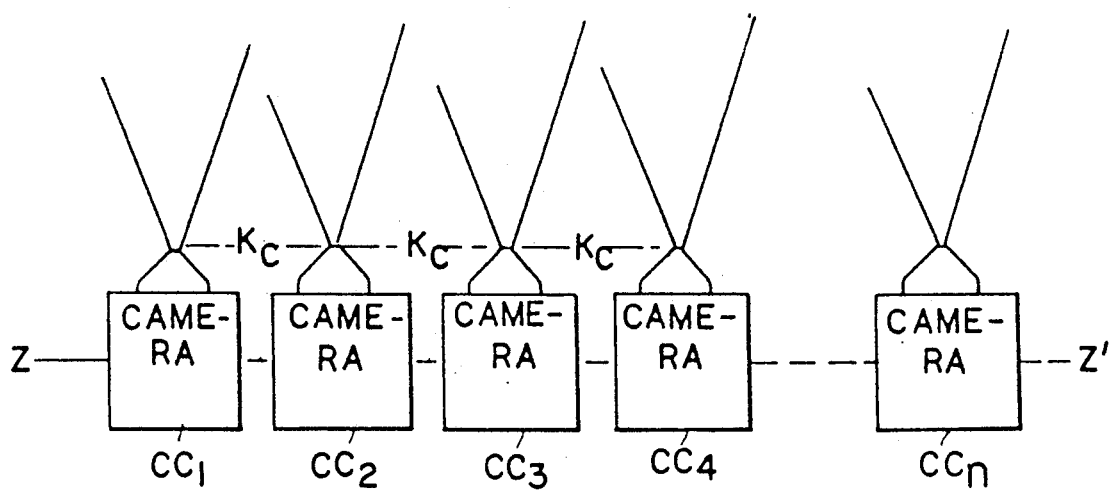
FIG. 1 is a schematic plan view of horizontally aligned, horizontally spaced cameras for taking picture for horizontal parallax reproduction in the system of FIGS. 2 and 3.

The images for reproduction in a preferred embodiment are obtained from a series of motion-picture cameras $CC_1$, $CC_2$, $CC_3$ ... $CC_n$ as shown in FIG. 1. The convergencies of the solid optical axes of the cameras are equidistantly spaced and the optical centres of the cameras are on a straight horizontal line ZZ'. The equal spacing between the cameras is called $K_c$.

Figure 2:
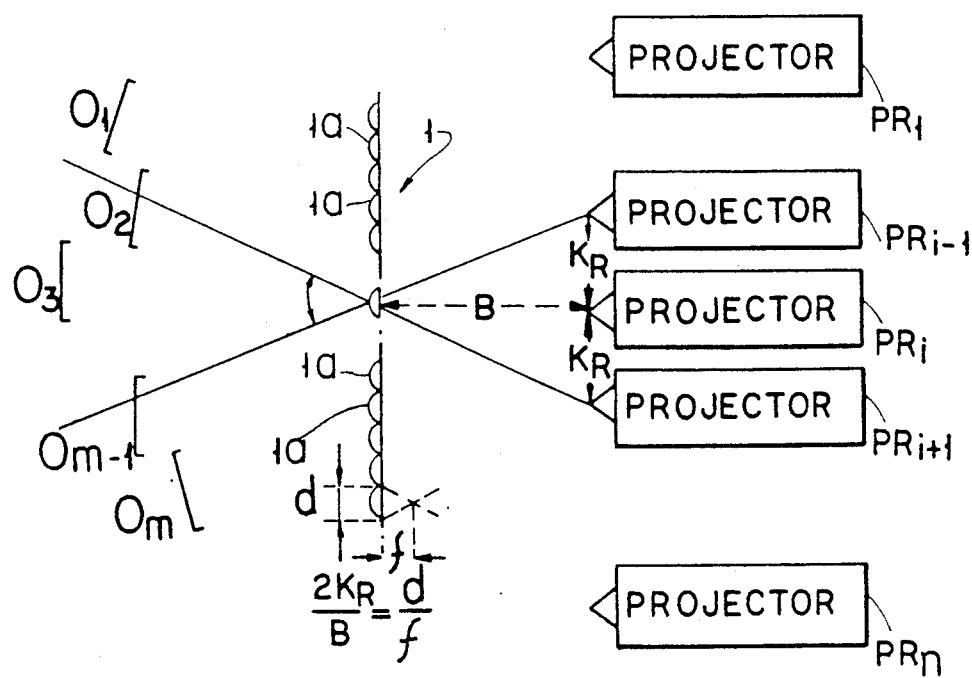
FIG. 2 is a schematic plan view of a horizontal parallax portion of an embodiment of horizontally aligned, horizontally spaced projectors for reproducing images from the respective cameras of FIG. 1 with horizontal parallax for observers also shown.

For reproduction, as shown schematically in FIG. 2 for one, horizontal dimension, a transparent optical sheet at 1 of converging cylindrical lenses $1a$ will be used. A number of motion-picture projectors $PR_1$ ... $PR_i$ ... $PR_n$ respectively project the images taken by the cameras of FIG. 1 through the sheets to observers $O_1$, $O_2$, $O_3$ ... $O_{m-1}$, and $O_m$. Thus, the same number of projectors as cameras is used.

The projectors are equidistant from one another, at a spacing $K_R$, and in horizontal alignment, like the cameras that were used in taking the images, at a distance B from the sheet such that each projector projects images onto the sheet. In this, it is important that the angles formed by the solid optical axes of the projectors be the same as those formed by the solid optical axes of the cameras. Otherwise, the projected images of a flat surface of equal parallax would appear to the observers as a curved surface in the reproduction.

The axes of the cylindrical lenses 1 are vertical, that is, perpendicular to the horizontal plane of the projectors. The distance B from the projectors to the sheet is decided by the focal length of the projectors and the size of the sheet.

The transverse dimension of each cylindrical lens $1a$ is small enough to be imperceptible. For an observer having healthy eyes, the transverse dimension d of the cylindrical lenses thus will have to be smaller then the viewing distance in metres divided by 3,500.

The focal length of the cylindrical lenses is given by:

$$f = B \frac{d}{2K_R},$$

which is obtained by comparing the aperture d/f of each cylinder with that $2K_{R/B}$ below which three projectors are seen. In practice, however, the aperture of the cylindrical lenses can be in a range between this value, taking three projectors and half of it, for a view taking in two projectors. In this way, an imperceptible transition from one image band to the next is achieved, since the part of the image from projector $PR_i$ mingles smoothly with that projected by its neighbors $PR_{i-1}$ and $PR_{i+1}$.

If the projectors are separated from one another, as shown in FIG. 2, the parallax of reproduction diminishes, but the three-dimensional viewing angle (V in FIG. 3) increases, and vice versa. Also, the relationship between transverse dimensions and focal length of the cylindrical lenses $1a$ must be made at least equal to the relationship between the distance $K_R$ between projectors and the projection distance B.

The view through the optical sheet 1 of only vertical cylindrical lenses is restricted to a line. This line is defined by the intersection of the plane which passes through the projectors and an observation point (one of observer $O_1$ to $O_m$) with the plane of the optical sheet. This is inadequate.

Figure 3:
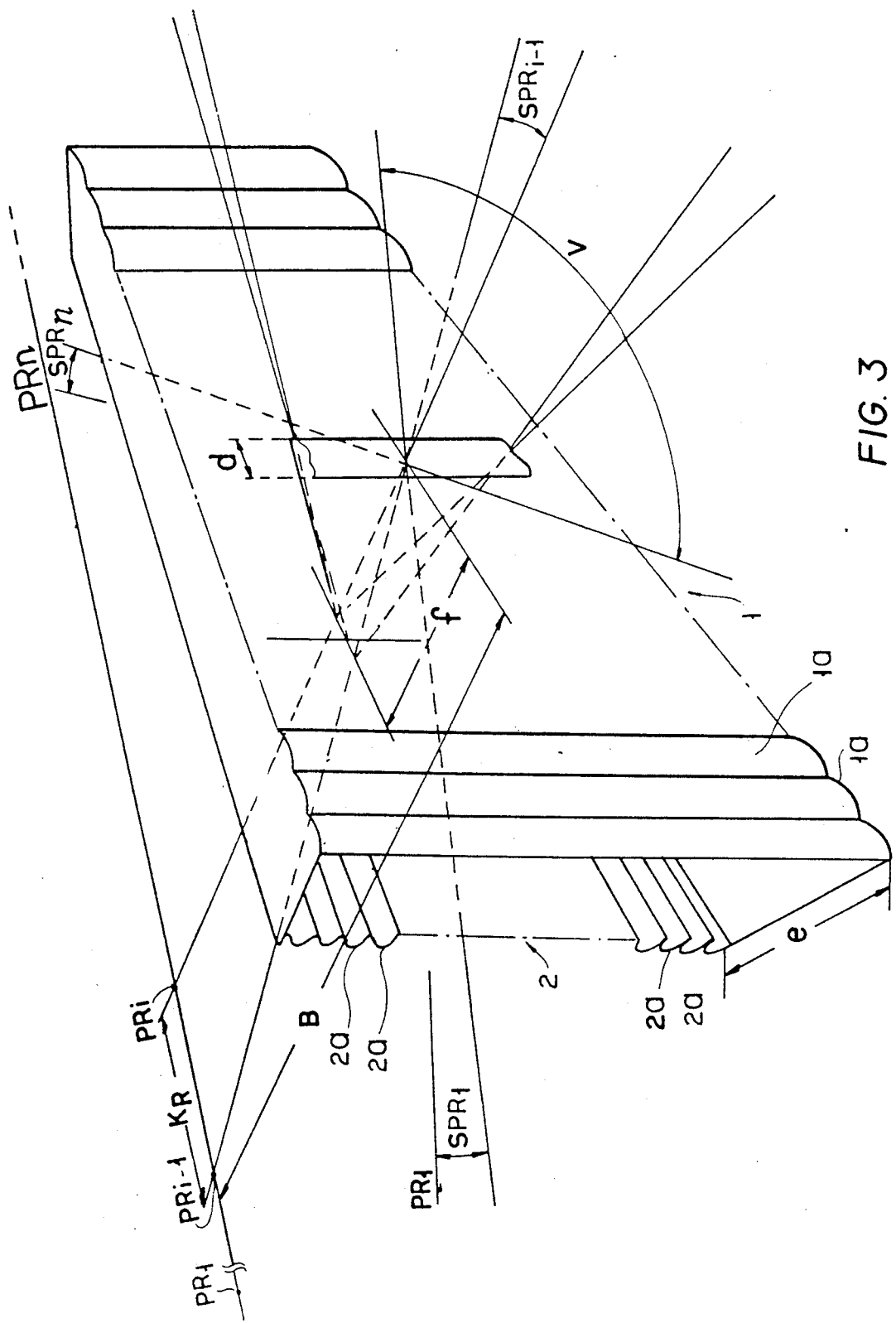
FIG. 3 is a schematic perspective view of another portion of the embodiment shown in FIG. 2.

To make the vertical field adequate, the preferred embodiment has, as shown in FIG. 3, another optical sheet 2 of horizontal cylindrical lenses $2a$. The horizontal cylindrical lenses $2a$ have sufficient aperture so that any observer, independently of his height, is able to see the whole vertical component of the image. Semi-circular cylindrical lenses $2a$ are preferred, therefore, since these have the maximum aperture. The transverse dimension of the horizontal cylindrical lenses $2a$, as in the case of the vertical cylindrical lenses $1a$, must be small enough so as to be imperceptible.

In the preferred embodiment the optical sheets 1, 2 are opposite sides of a single optical member 3. Viewing is made through the optical-member transparency, as best shown in FIG. 2.

In FIG. 3, however, the horizontal viewing angle V for the three-dimensional effect can be best appreciated. It is a function of the quotient between the distance of separation from the first to the last projectors $PR_1$ to $PR_n$, the projection distance B.

In a similar way, the viewing angles $SPR_1$ to $SPR_n$ of the horizontal cylindrical lenses can be seen in FIG. 3. It is a function of the quotient between the separation $K_R$ between adjacent projectors and the projection distance B. A quotient which is the same as that obtained between the transverse dimensions of the vertical cylinder d and its focal length f.

So that the focal lines of the horizontal and vertical cylindrical lenses $2a$ and $1a$ coincide on the same plane, the thickness e of the optical member 3 must have the value:

$$e = \frac{n}{n-1}(r_2 - r_1),$$

where $r_1$ and $r_2$ are the radii of the vertical and horizontal cylindrical lenses, respectively, and n is refractive index of the substance from which the optical member 3 is made.

Obviously, in another embodiment (not shown), both optical sheets (1 and 2 in FIG. 3) can be cut onto the same surface of an optical member. In this case, the distance between horizontal and vertical cylindrical lenses is nil. If these then have different focal lengths, the superimposition of the horizontal and vertical focus lines in the image reproduced can be achieved with different, horizontal and vertical focal lengths in the projection objective of the projectors. Another system for this embodiment can also be designed with the same focal lengths for both optical sheets, their different apertures being achieved through respectively different transverse dimensions for the horizontal and vertical cylindrical lens.

A second version (not shown) of either of the above-described embodiments can be achieved by substituting a specular optical sheet for the transparent sheets described while retaining the same optical characteristics. In this case, the image will be observed by reflection and projection will be from the front, viewing side.

A third version (not shown) of either of the above-described embodiments can be by substituting complex lenses for the simple lenses described above.

Combinations of these embodiments and versions are also possible to give a large number of variations.

The same principles which have been described to create embodiments of horizontal three-dimensional reproduction, i.e. with variation of the horizontal parallax, can also be applied for an integral reproduction system (not shown) which reproduces horizontal and vertical three dimensions.

The design of the vertical cylindrical lenses will be the same as described above.

The design of the horizontal cylindrical lenses will now be similar to the design of the vertical cylindrical lenses, however. Their focal length will be such that the relationship between the transverse dimension of each horizontal cylindrical lens and its focal length is at least equal to the relationship between the vertical distance between three vertically spaced projectors and the projection distance. So, the focal length $f_H$ of each horizontal cylindrical lens must fulfill:

$$f_H = \frac{d_H B}{2K_{RV}}.$$

where $d_H$ = the transverse dimension of each horizontal cylindrical lens;

B = the projection distance; and $K_{RV}$ = the vertical distance between adjacent vertically spaced projectors.

The optical-sheet thickness formula given above for the system that reproduces horizontal parallax continues to be valid.

What is claimed is:

1. In a system for reproducing images three-dimensionally, the system having first projectors spaced from each other a first distance along a horizontal line, the first projectors being for projecting the images, the images being from respectively corresponding cameras spaced along a horizontal line, this projecting of the images being over a second distance onto an optical member from which the images are observed, the improved optical member comprising:

first optical sheet means comprising vertical cylindric lenses, the aperture of each vertical cylindric lens being at least equal to a first value of the quotient obtained by dividing the first distance by the second distance and less than twice the first value for providing the images with horizontal parallax; and second optical sheet means comprising lens means for vertically expanding the images provided by the first optical sheet means.

2. The system of claim 1, wherein second projectors are spaced from the first projectors and each other a third distance along a vertical line, the second projectors being for projecting images from respectively corresponding cameras spaced along another vertical line, this projecting of the images being over a fourth distance onto the optical member, the further improvement of the optical member wherein:

the lens means comprises horizontal cylindric lenses, the aperture of each horizontal cylindric lens being at least equal to a second value of the quotient obtained by dividing the third distance by the fourth distance and less than twice the second value.

3. The system of claim 1, wherein the lens means comprises horizontal cylindric lenses.

4. The system of claim 1, wherein each cylindric lens is optically convergent.

5. The system of claim 2, wherein each cylindric lens is optically convergent.

6. The system of claim 3, wherein each cylindric lens is optically convergent.

7. The system of claim 1, wherein each cylindric lens is optically divergent.

8. The system of claim 2, wherein each cylindric lens is optically divergent.

9. The system of claim 3, wherein each cylindric lens is optically divergent.

10. The system of claim 2, wherein one of the vertical and horizontal cylindric lenses is convergent and the other is divergent.

11. The system of claim 3, wherein one of the vertical and horizontal cylindric lenses is convergent and the other is divergent.

12. The system of claim 2, wherein one of the vertical and horizontal cylindric lenses is transparent and the other is specular.

13. The system of claim 3, wherein one of the vertical and horizontal cylindric lenses is transparent and the other is specular.

14. The system of claim 4, wherein one of the vertical and horizontal cylindric lenses is transparent and the other is specular.

15. The system of claim 7, wherein one of the vertical and horizontal cylindric lenses is transparent and the other is specular.

16. The system of claim 4, wherein the vertical and horizontal cylindric lenses are on one of the same and opposite sides of the optical member.

17. The system of claim 7, wherein the vertical and horizontal cylindric lenses are on one of the same and opposite sides of the optical member.

18. The system of claim 10, wherein the vertical and horizontal cylindric lenses are on one of the same and opposite sides of the optical member.

19. The system of claim 12, wherein the vertical and horizontal cylindric lenses are on one of the same and opposite sides of the optical member.

* * * * *